United States Patent
Bugnon et al.

(10) Patent No.: US 6,258,158 B1
(45) Date of Patent: Jul. 10, 2001

(54) PROCESS FOR PIGMENTING POROUS METAL OXIDES AND MATERIALS PIGMENTED THEREWITH

(75) Inventors: Philippe Bugnon, Essert (CH); Seiji Homma, Kobe (JP); Patrick Verhoustraeten, Lörrach (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 09/436,277

(22) Filed: Nov. 8, 1999

(30) Foreign Application Priority Data

Nov. 9, 1998 (DE) ................................. 98121318
Nov. 30, 1998 (DE) ................................. 98811186

(51) Int. Cl.$^7$ ................................. C08K 5/00
(52) U.S. Cl. .................. 106/493; 106/404; 106/415; 106/493; 106/494; 106/495; 106/496; 106/497; 106/498; 106/499
(58) Field of Search ............... 106/404, 415, 106/425, 426, 436, 442, 450, 481, 483, 493–499

(56) References Cited

U.S. PATENT DOCUMENTS

| | | | |
|---|---|---|---|
| 3,761,297 | 9/1973 | Figueras | 106/289 |
| 4,066,816 | 1/1978 | Sheasby et al. | 428/336 |
| 4,310,586 | 1/1982 | Sheasby et al. | 428/220 |
| 4,559,269 | 12/1985 | Beach et al. | 428/403 |
| 4,828,976 | 5/1989 | Borror et al. | 544/58.4 |
| 5,112,449 | 5/1992 | Jozefowicz et al. | 205/175 |
| 5,202,013 | 4/1993 | Chamberlain et al. | 205/229 |
| 5,243,052 | 9/1993 | Taylor et al. | 546/154 |
| 5,484,943 | 1/1996 | Zambounis et al. | 548/453 |
| 5,561,232 | 10/1996 | Hao et al. | 546/14 |
| 5,585,189 | 12/1996 | Inoue et al. | 428/461 |
| 5,723,626 | 3/1998 | Hao et al. | 548/467 |
| 5,780,627 | 7/1998 | Hao et al. | 544/74 |
| 5,811,543 | 9/1998 | Hao et al. | 540/123 |
| 5,840,449 | 11/1998 | Zambounis et al. | 430/7 |
| 5,874,580 | 2/1999 | Hao et al. | 540/37 |
| 5,879,855 | 3/1999 | Schadeli | 430/270.1 |
| 5,886,160 | 3/1999 | Hao et al. | 534/733 |
| 5,931,996 | * 8/1999 | Reisser et al. | 106/404 |
| 6,036,767 | * 3/2000 | Inoue et al. | 106/498 |

FOREIGN PATENT DOCUMENTS

| | | |
|---|---|---|
| 2117860 | 4/1995 | (CA) . |
| 648 770 | 4/1995 | (EP) . |
| 648 817 | 4/1995 | (EP) . |
| 742 556 | 11/1996 | (EP) . |
| 654 711 | 6/1999 | (EP) . |
| 04/124175 | 4/1992 | (JP) . |
| 95/20015 | 7/1995 | (WO) . |
| 98/32802 | 12/1998 | (WO) . |
| 98/58027 | 12/1998 | (WO) . |

OTHER PUBLICATIONS

Derw. Abst. 1993–030941[25] of JP 4357186.
Derw. Abst. 1992–376357 [46] of JP 4275378.
Patent Abst. Of Japan. vol. 10 No. 390 of JP61179263.
Abst. No. 89–216528/30 of JP 01/153,761 11/87.
Abst. No. 92–189245/23 of JP 04/124,175 9/90.
Aluminum Paint and Powder, J.D. Edwards et al., 188, 3$^{rd}$ edition (1955)pp. 183–219.
The Metal Industry, O. Smalley, vol. XXV, No. 16, pp. 369–371.
Paint Manufacture, G. Wendon, vol. XX, No. 11 (1950) pp. 397–400.

* cited by examiner

Primary Examiner—Mark L. Bell
Assistant Examiner—Michael J. DiVerdi
(74) Attorney, Agent, or Firm—David R. Crichton

(57) ABSTRACT

The present invention relates to a process for pigmenting a porous metal oxide by applying a solution of a soluble pigment derivative and regenerating the organic pigment by heating, whereby the organic pigment is deposited into the metal oxide's pores. The invention also relates to pigmented porous metal oxides and materials comprising a solid substrate and a surface layer of a pigmented metal oxide.

31 Claims, No Drawings

PROCESS FOR PIGMENTING POROUS METAL OXIDES AND MATERIALS PIGMENTED THEREWITH

The present invention relates to a process for pigmenting a porous metal oxide by applying a solution of a soluble pigment derivative and regenerating the organic pigment by heating, whereby the organic pigment is deposited into the metal oxide's pores. The invention also relates to pigmented porous metal oxides and materials comprising a solid substrate and a surface layer of a pigmented metal oxide.

BACKGROUND OF THE INVENTION

Porous materials are commonly coloured with dyes that are applied, for example, as stains. In order to achieve satisfactory colouring results with this method a requirement is that the porous material to be coloured has a high and uniform affinity for the dye. Porous materials coloured with dyes possess, however, a light stability which is very unsatisfactory especially in outdoors applications. This is particularly a problem in the case of materials which are themselves highly weather-fast, such as metal oxides, because the colour undesirably disappears much earlier than the material is itself altered.

Another method of imparting a coloured appearance to porous materials is to provide them with a pigmented coating. This method, however, has the disadvantage that the visual appearance of porous materials such as metal oxides is changed. This is a great disadvantage, especially with metal oxides, since it is their properties, especially their transparency when applied in thin layers, that are the most prized. In addition, a pigmented coating is generally much less stable to weather and chemicals than, for example, the metal oxides onto which they are coated. With time, pigmented coatings decrease in gloss, fade and eventually become brittle and finally peel off.

U.S. Pat. No. 4,066,816 discloses the deposition of undefined inorganic pigmentary material onto at least 3 $\mu$m, preferably 15–30 $\mu$m thick porous aluminium oxide layers. However, very little colouration is achieved unless the pore diameter is increased, and this process is hardly useful for commercial purposes because of the predominant bronze tone (muddiness). U.S. Pat. No. 4,310,586 teaches to grow a second oxide film beneath the inorganic deposits, but this process is very difficult to control as a whole, as the colour results from optical interference and small thickness variations of the deposits or the second oxide film lead to undesirably large colour changes. Moreover, the products have less satisfactory chemical and physical properties than usual oxide layers.

U.S. Pat. No. 5,585,189 dicloses an electrophoresis process for pigmenting anodic oxide films on aluminium. However, it is necessary to increase the pore size to 50 to 250 nm, whereby the visual appearance and the weathering properties are impaired due to the rough surface. In addition, this process does not lead to satisfactory results with high performance red pigments such as diketo-pyrrolo-[3,4-c]-pyrroles and quinacridones.

Hence, the coloration of metal oxides or of materials comprising a solid substrate and a surface layer of a metal oxide has long been a problem with no satisfactory solution.

EP 648 770 and EP 648 817 disclose carbamate-functional, soluble chromophores which can be converted to the corresponding pigments by being heated to relatively high temperatures, with the ensuing elimination of the carbamate radicals. These compounds are suitable for the mass colouring of polymers and, according to EP 654 711, for the colouring of resists and of polymer coatings to which they are applied. Compounds of the same type but with improved properties are known from EP 742 556, WO 98/32802, WO 98/45757, WO 99/01511, CH-98/1922 and CH-99/702.

U.S. Pat. No. 5,243,052 discloses carbonates of quinophthalones, which are of limited solubility and can be used in heat-sensitive recording systems. The leuco dye is embedded within a polymer, preferably in polyethyloxazoline.

Soluble derivatives of triphenylmethane dyes are known from U.S. Pat. No. 4,828,976. They are likewise used in heat-sensitive recording systems, together with a binder such as cellulose acetate-butyrate, polyvinyl pyrrolidone or copolymerized ethylene/maleic anhydride.

EP 742 556, furthermore, describes textured pigmentary coatings which are prepared from soluble or meltable precursors and which cover all of or part of a substrate surface. The substrates mentioned include fibres and fabrics. It has been found, however, that these pigmentary coatings fail to entirely meet high requirements especially in terms of their rub fastness.

SUMMARY OF INVENTION

Also known, finally, are numerous heat-sensitive recording systems in which colourless precursors of colourants—as solids, in the form, for example, of aqueous suspensions, together with binders and with or without fillers—are incorporated as the recording layer. For example, JP 04/124,175 describes leucoindigoid derivatives. Colourants in solid form, however, such as conventional pigments, make hardly any entry into the pores but for the most part remain, undesirably, on the surface.

It has now surprisingly been found that porous metal oxides and materials comprising a solid substrate and a surface layer of a metal oxide can be coloured without impairing their properties if fragmentable pigment precursors in melted or dissolved form are introduced into the pores and then converted thermally to organic pigments. The porous surface is then still functionally available for any desired subsequent treatment, such as sealing, glueing, bonding, marking, laminating or coating, entirely or only in part, by any of the many known techniques routinely used in the field. The pigmented materials may advantageously also be cut, milled, bent or joined identically to the non-pigmented materials. Consequently, either finished articles or raw material, as desired, can be coloured prior to processing, shaping or assembling.

It is, surprisingly, also possible to obtain non-bleeding, very high colour saturations (chroma) by using high pigment concentrations. Thus, pigmented metal oxides of fine particle size can be used as pigments for colouring high molecular mass organic material. The results are excellent with respect to hue and chroma as well as also to the transparency, when the porous material has a refraction index similar to that of the substrate into which it is incorporated. Very advantageously, these products are less dusting and are more easily incorporated into substrates than usual transparent pigments, and rheology problems can be avoided. Particles comprising a layer of a pigmented porous metal oxide may be used themselves as pigments, too.

The resulting colorations are surprisingly strong in colour, fast to weathering, light and heat, rubbing, water and solvent, and are also optically highly uniform provided the material itself is uniform in its porosity.

DETAILED DESCRIPTION OF INVENTION

The present invention accordingly provides a process for preparing a coloured metal oxide or a material comprising a solid substrate and a layer of a coloured metal oxide, wherein the coloured metal oxide or metal oxide layer comprises an effective colouring amount of an organic pigment, which process comprises (a) treating a porous metal oxide or a material comprising a surface layer of a porous metal oxide with a solution or melt of a soluble pigment precursor such that at least part of the pigment precursor enters the pores of the metal oxide, and (b) regenerating said organic pigment within the pores, through fragmentation of the pigment precursor that has entered the pores of the metal oxide in accordance with treatment (a), by means of heating or irradiation, with the proviso that the coloured metal oxide is not pumice, fired clay, unglazed porcelain, gypsum, concrete, kieselguhr, silica gel or a zeolite.

Porous metal oxides are preferably colourless or only slightly coloured, such as the oxides of elements of the periodic table's groups 2, 3, 4, 12, 13 and 14 (IUPAC) and mixtures thereof, for example the oxides of Al, Si, Zr, Mg or Ti. Very particularly preferred are porous oxides of aluminium or an alloy thereof, such as alumina.

The present metal oxides may be pure or also contain anions of acids, such as mineral acids, which are routinely used for transforming a metal into its oxide, for example sulfate, phosphate or chromate anions.

In a preferred embodiment, the material comprises a solid substrate and a surface layer of a porous metal oxide. The solid substrate may, for example, be a piece of metal of any size, such as a metallic plate or profile. The solid substrate may, however, also be a metal oxide, for example a ceramic.

The concentration of the organic pigment may be low or high, depending of the desired colour saturation. A low concentration of the organic pigment in the metal oxide leads to pastel tints, while a high concentration of the organic pigment in the powdered inorganic material leads to higher saturations. Usefully, the metal oxide or metal oxide layer to be pigmented by the process of this invention is sufficiently porous for the desired quantity of soluble pigment precursor to be incorporated.

When the porous metal oxide to be pigmented is a surface layer on a substrate, then this layer can be prepared on known substrates by well-known methods. A porous metal oxide layer may, for example, be prepared by precipitation from aqueous solutions of metal salts through addition of an acid or a base, by vapor-deposition or by oxidation of a metal layer. Precipitation from aqueous solutions and vapor-deposition are preferred in the case of small parts such as particles, while oxidation is preferred in the case of bigger objects such as metallic plates, sheets or profiles. Porous metal oxide layers have suitably a thickness of at least 0.05 $\mu$m, especially at least 0.5 $\mu$m, for example from 1 to 250 $\mu$m. Metal oxide layers of thickness from 2 to 100 $\mu$m, particularly from 3 to 50 $\mu$m, are preferred on bigger objects.

In a particularly preferred embodiment, a material to be pigmented by the process of this invention is obtained by oxidizing a metallic substrate, optionally in the presence of an acid and/or electrochemically, thereby forming a porous layer of metal oxide directly on the metallic substrate. Many such processes are known, such as the industrially very important anodic oxidation of aluminium or alloys thereof with all its known variants. Only as examples, to which the invention is of course not limited, they may be used the processes disclosed or referred to in U.S. Pat. No. 5,112,449 or U.S. Pat. No. 5,202,013.

Anodized aluminium and alloys thereof pigmented with the process of this invention have surprisingly a deeper colour and a higher colour saturation then when coloured with dyes.

Besides the pigmented metal oxide layer, the materials of this invention may optionally also be coated with an outer coating, which may consist of one or more layers of various materials in accordance with the function to be performed. For example, the outer coating may consist of a transparent or selectively absorbing dielectric material of any kind, the specific electrical resistance of which according to the customary definition is at least $10^{10}$ $\Omega$·cm.

Where appropriate, the outer coating preferably consists of a metal oxide, oxide hydrate, hydroxide or metal fluoride, for example of $TiO_2$, $ZrO_2$, $SiO_2$, $SnO_2$, $GeO_2$, $ZnO$, $MgO$, $Al_2O_3$, $Al_2O_3 \cdot 3 H_2O$ or $MgF_2$, or a mixture thereof. Special preference is given to those metal oxides, oxide hydrates or hydroxides which have high weather stability. The person skilled in the art will know which material is suitable for which function, in which useful thicknesses. Of course, the outer coating may also consist of multiple layers.

The thickness of a protective outer coating is most usefully no greater than 200 nm, preferably no greater than 100 nm, especially no greater than 50 nm. The outer coating may, however, also reflect part of the incident light, or refract the incident light and the light reflected by the core, generating interference effects. In this case, its refractive index is preferably as high as possible, for example above 2.0. The thickness of a reflective outer coating is most usefully from 100 to 400 nm.

Instead of applying an additional coating, it is however also possible to modify the pigmented metal oxide layer in such a way that its long-term stability is improved. Many such sealing treatments are well-known in the field. In the case of anodized aluminium, the surface aluminium oxide can for example be partially or entirely transformed into aluminium hydroxide by a treatment with hot vapor.

The skilled artisan will obviously recognize that the instant process may be combined with any other known treatment, such as those already disclosed above. The instant pigmented metal oxides may be substituted with great coloristic advantages for non-coloured or differently coloured metal oxides. In particular, any additional feature known for the prior art metal oxides, such as the presence of additional layers thereon, may also be used in combination with the instant pigmented metal oxides.

Highly surprisingly, anodized aluminium pigmented by the process of this invention and then additionally subjected to a sealing process has very high stability to light and weathering, opening the way for high-tech outdoor applications such as for example windows or facade elements for buildings, or parts for railroad cars or aircrafts.

It is also possible to pigment fine particles of porous metal oxides and to use these pigmented particles as pigments for high molecular mass organic materials. The particle size is preferably from 0.1 to 10 $\mu$m, most preferably from 1 to 3 $\mu$m. The organic pigment's concentration may be low or high, depending of the desired colour saturation. A low concentration of the organic pigment in the metal oxide powder leads to pastel tints, while a high concentration of the organic pigment in the metal oxide powder leads to higher saturations.

Another type of fine particles which can be pigmented with the instant process are metallic flakes comprising a surface layer of metal oxide, for examples flakes of aluminium or alloys thereof. The size of the particles is not critical per se and can be adapted to the particular use. Generally, the flakes have a length from about 1 to 200 μm, in particular from about 5 to 50 μm, and thicknesses from about 1 to 5 μm, preferably from 1 to 2 μm, including the metal oxide layer. In flakes, the oxide layer is preferably from 0.05 to 1 μm. Flakes are understood to be particles having two essentially flat and parallel surfaces, with an aspect ratio length to thickness of from about 2:1 to about 1000:1, and a length to width ratio of from 3:1 to 1:1.

The instant process leads to pigmented flakes of highly better coloristic and physical properties than flakes coloured by prior art processes, such as those disclosed in The Metal Industry XXV/16, 369 (London 1924), The Metal Industry 15/7, 298 (N.Y. 1917), Paint Manufacture XX/11, 397 (1950) or Aluminum Paint and Powder by J. D. Edwards and R. I. Wray, 188–189 (Reinhold Publishing Corp., N.Y. 1955). In particular, the instant pigmented flakes possess a much higher light stability.

Examples of high molecular mass organic materials which can be pigmented with particles of novel pigmented porous metal oxides or of materials comprising a solid substrate and a layer of a porous metal oxide are cellulose ethers, cellulose esters, such as ethylcellulose, nitrocellulose, cellulose acetate and cellulose butyrate, natural resins or synthetic resins, such as addition polymerization resins or condensation polymerization resins, such as amino resins, especially urea-formaldehyde and melamine-formaldehyde resins, alkyd resins, phenolic resins, polycarbonates, polyolefins, polystyrene, polyvinyl chloride, polyamides, polyurethanes, polyesters, ABS, polyphenylene oxides, rubber, casein, silicone and silicone resins, individually or in mixtures.

The above-mentioned high molecular mass organic compounds can be present, individually or in mixtures, as plastic masses, as melts or in the form of spinning solutions, varnishes, coating materials or printing inks. Organic high molecular mass materials coloured with the novel pigmented porous material powders possess outstanding colour properties. This invention therefore also provides a composition comprising a high molecular mass organic material and an effective pigmenting amount of a novel coloured metal oxide or material comprising coloured metal oxide particles.

The particles of novel pigmented porous metal oxides or of materials comprising a solid substrate and a pigmented layer of a porous metal oxide are preferably employed in an amount of from 0.1 to 50% by weight, most preferably from 1 to 30% by weight, based on the high molecular mass organic material to be pigmented.

The pigmenting of the high molecular mass organic substances with the novel pigmented porous material powders is carried out, for example, by mixing such solid solutions, in the form of masterbatches if desired, into these substrates using roller assemblies, mixers or milling apparatus. The pigmented material is subsequently brought into the desired final form by methods known per se, such as calandering, compression moulding, extrusion, coating, casting or injection moulding. So as to produce non-rigid mouldings, or to reduce their brittleness, it is often desirable to incorporate plasticizers into the high molecular mass compounds prior to their moulding. Examples of compounds which can be used as such plasticizers are esters of phosphoric acid, phthalic acid or sebacic acid. The plasticizers can be incorporated into the polymers before or after the incorporation of the novel pigmented porous material powders. In order to achieve different colour effects, it is also possible to add to the high molecular mass organic substances not only the novel pigmented porous material powders but also fillers, reflecting metallic or inorganic particles, for example aluminium flakes or mica, and/or other colour-imparting constituents, such as white, coloured or black pigments, in any desired quantities.

For the pigmentation of varnishes, coating materials and printing inks, the high molecular mass organic materials and the novel pigmented particles, together if desired with additives such as fillers, other pigments, siccatives or plasticizers, are finely dispersed or dissolved in an organic solvent or solvent mixture for them both. In this context it is possible to follow a procedure in which the individual components are dispersed or dissolved individually or else two or more of them are dispersed or dissolved together and only then to combine all of the components.

The inventive pigmented porous material particles are particularly suitable for colouring plastics, especially polyvinyl chloride and polyolefins, and for colouring paints, preferably automotive or metallic finishes, for example those containing other pigments, metal particles or mica particles.

Metal oxides considered as porous are those, which have cavities within their physical shell, which may be partly or totally filled with a gas, for example air, or with a liquid, for example water. Preferably, the pores extend at least in part to the surface of the material. The volume of the pores is preferably at least 5% relative to the volume of the geometric shell of the material. Particularly preferably, the volume of the pores is from 20 to 90% relative to the volume of the geometric shell of the material. Preferably, the cross-section of the pores is so fine that by virtue of capillary force an aqueous liquid does not flow out under gravity. The average cross-section of the pores is in particular from $1 \cdot 10^{-18}$ to $4 \cdot 10^{-14}$ m$^2$, very preferably from $1 \cdot 10^{-17}$ to $1.8 \cdot 10^{-15}$ m$^2$. The average cross-section of the pores may be determined at the surface for flat materials, or at a transverse section through the material, by dividing the total pore area by the number of pores.

The methods of and conditions for making porous metal oxides and layers thereof are known to the skilled artisan and are disclosed in the technical literature, to which express reference is hereby made, for example in Ullmann's Encyclopaedia of Industrial Chemistry (5$^{th}$ Edition 1996) or Kirk-Othmer Encyclopaedia of Chemical Technology (3$^{rd}$ Edition 1978). Introducing the pigment precursor into the pores of the porous material is effected by applying a solution or melt of the pigment precursor to the porous material using any desired, known method, for example by spraying or impregnation in a bath. The application temperature can be an elevated temperature but is judiciously kept low enough for the dissolved or melted pigment precursor not to undergo any, or any significant, decomposition during the minimum time required for the application.

Suitable solvents are water or, preferably, any desired protic or aprotic solvent, examples being hydrocarbons, alcohols, amides, nitriles, nitro compounds, N-heterocycles, ethers, ketones and esters which may also be either mono- or polyunsaturated or chlorinated: examples are methanol, ethanol, isopropanol, diethyl ether, acetone, methyl ethyl ketone, 1,2-dimethoxyethane, 1,2-diethoxyethane, 2-methoxyethanol, ethyl acetate, tetrahydrofuran, dioxane, acetonitrile, benzonitrile, nitrobenzene, N,N-dimethylformamide, N,N-dimethyl-acetamide, dimethyl sulfoxide, N-methylpyrrolidone, pyridine, picoline, quinoline, trichloroethane, benzene, toluene, xylene, anisole and chlorobenzene. Further examples of solvents are described in numerous tabular and reference works. Instead of a single solvent it is also possible to employ mixtures of two or more solvents.

Preference is given to those solvents which do not corrode the metal oxide that is to be coloured, or do so only very slowly, and which have a boiling point of between 40° C. and 170° C., especially to aromatic hydrocarbons, alcohols, ethers, ketones and esters. Particular preference is given to toluene, methanol, ethanol, isopropanol, 1,2-dimethoxyethane, 1,2-diethoxyethane, 1-methoxy-2-propanol, acetone, methyl ethyl ketone, ethyl acetate, tetrahydrofuran and dioxane, and mixtures thereof.

The concentration of the pigment precursor in water or a solvent is usually from 0.01% by weight, based on the weight of the solution, to approximately 99% by weight of the saturation concentration, it also being possible in certain cases to employ supersaturated solutions without premature precipitation of the solvate. For many pigment precursors the optimum concentration is around ~0.1–50% by weight, often around 1–20% by weight, based on the weight of the solution. For some combinations of pigment precursors and solvents, it may be as high as about 75% by weight.

Conversion of the pigment precursor into the pigmentary form takes place by fragmentation under known conditions, for example thermally in the presence or absence of a catalyst, such as an acid or a cationic photoinitiator which can be introduced into the pores of the porous metal oxide before, at the same time as or after the pigment precursor.

Fragmentation can be carried out individually, or simultaneously with any further known, subsequent treatment; for example, in the course of sealing the metal oxide.

By an effective colouring amount is meant that amount which is sufficient to bring about a colour difference $\Delta E^*$ (CIE-L*a*b*) of $\geq 2$ when the coloured material is compared with the uncoloured material under the standard illuminant $D_{65}$ and at a viewing angle of 10°. This amount is preferably from 0.01 to 30% by weight, most preferably from 0.1 to 15% by weight, based on the weight of the coloured material.

Judicious fragmentable pigment precursors are those whose structure includes a complete pigment framework substituted on at least one heteroatom N, O or S. The substituent involved is preferably an oxycarbonyl radical. Where the heteroatom is part of the chromophore or bonded directly to the chromophore, in the course of fragmentation the oxycarbonyl radical is generally eliminated and replaced by a hydrogen atom, so that the structure of the resulting pigment corresponds to that of the unsubstituted pigment framework. Where, on the other hand, the heteroatom is bonded to a substituent of the chromophore, then the fragmentation process is sometimes more complex, and the precise structure of the resulting pigment cannot always be clearly ascertained.

The pigment precursors can be employed individually or else in mixtures with other pigment precursors or with colourants—for example, dyes customarily used for the corresponding application. Preferably, pigment precursors are employed, whose colour in the pigmentary form is red, violet, yellow, blue, green, brown or black. Where the pigment precursors are employed in mixtures, the components of the mixture are preferably those whose colour in the pigmentary form is red, violet, yellow, blue or green. Any dyes added are likewise preferably red, violet, yellow, blue or green. It is however preferred not to use dyes as this generally decreases the light stability.

Preferred pigment precursors are, for example, compounds of the formula (I)

$$A(B)_x \qquad (I),$$

in which x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series which is attached to x groups B via one or more heteroatoms selected from the group consisting of N, O and S and forming part of the radical A, B is hydrogen or a group of the formula

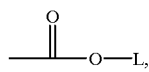

where at least one group B is not hydrogen and, if x is from 2 to 8, the groups B can be identical or different, and L is any suitable solubilizing group, for example tert-butyl or tert-amyl. Many other groups suitable for solubilizing pigments are known, for example, from the publications referred to above.

A preferably contains at least one directly adjacent or conjugated carbonyl group at each heteroatom attached to x groups B.

A is the radical of known chromophores having the basic structure $$A(H)_x,$$

examples being

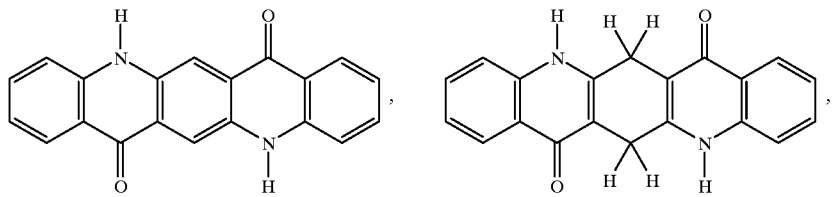

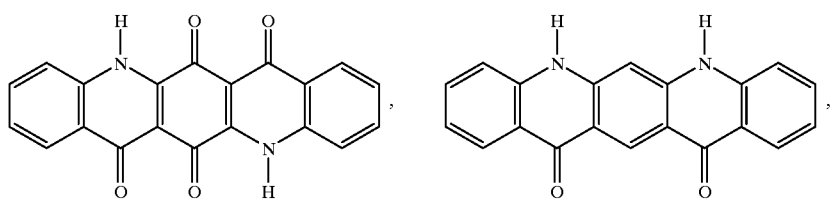

-continued
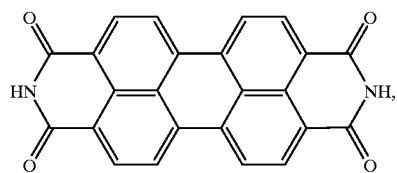 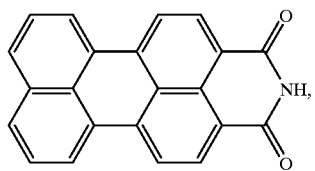 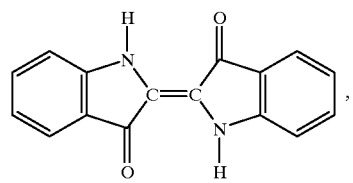
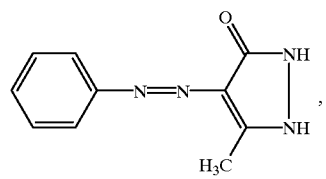 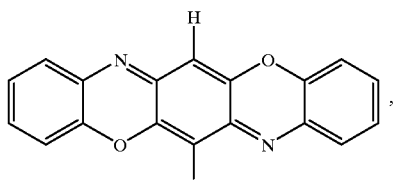
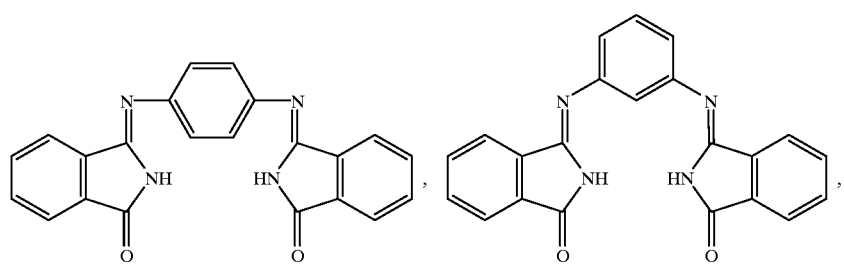
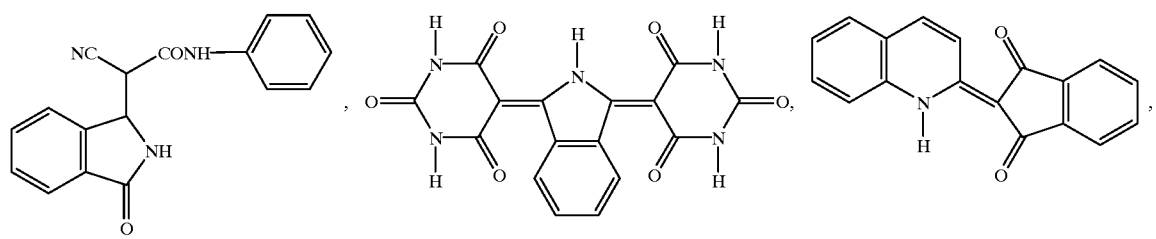
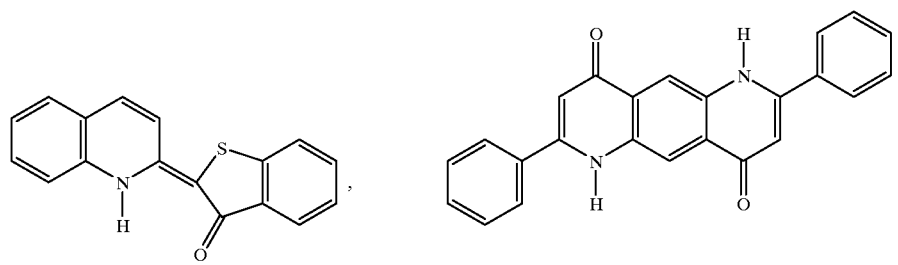
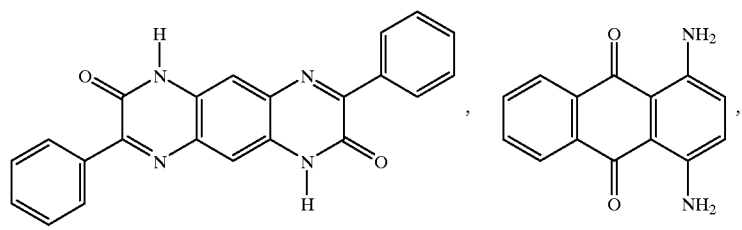

-continued
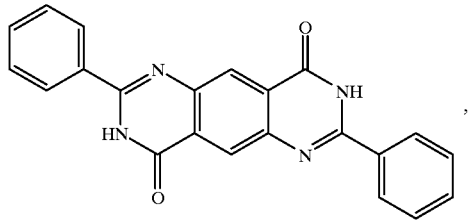,
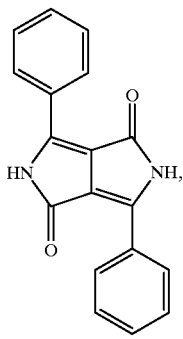,
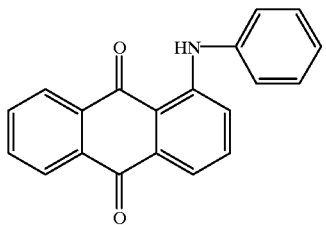,
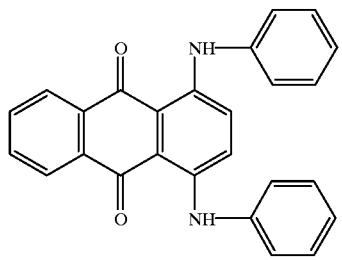,
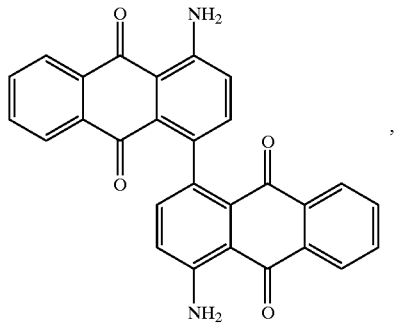,
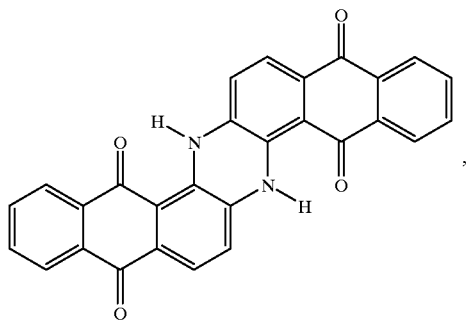,
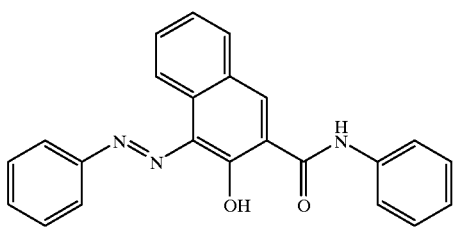,
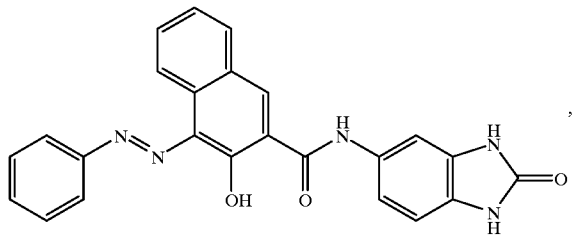,
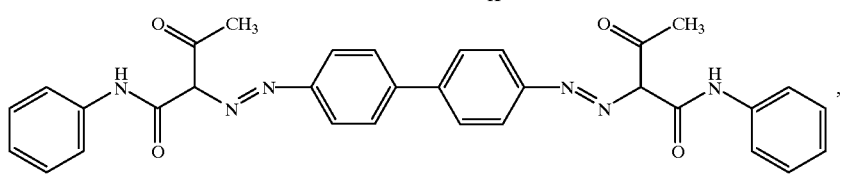,
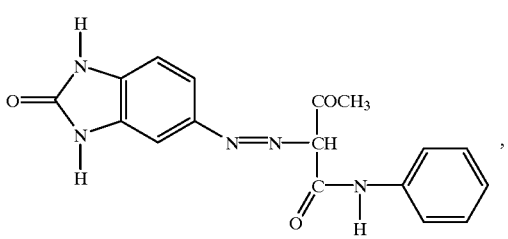,
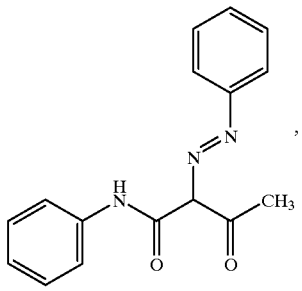, -continued

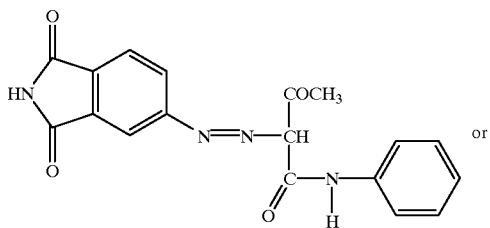

or

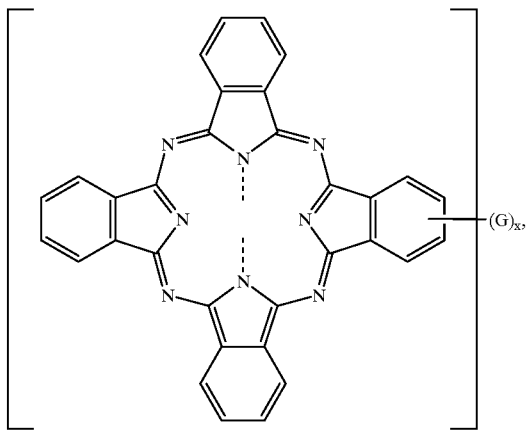

wherein G is a group having at least a NH or OH moiety and x is a number from 1 to 16, and all known derivatives thereof.

Preferred compounds of the formula I are:

a) perylenecarboximides of the formula

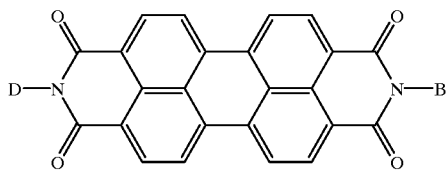

(IIa)

or

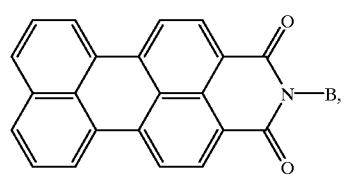

(IIb)

in which D is hydrogen, $C_1$–$C_6$alkyl, unsubstituted or halo- or $C_1$–$C_6$alkyl-substituted phenyl, benzyl or phenethyl or B, b) quinacridones of the formula

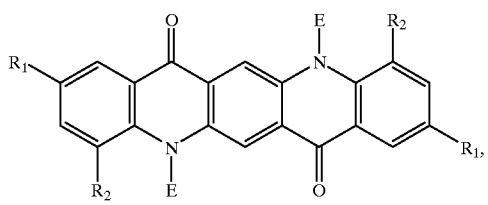

(III)

in which $R_1$ and $R_2$ independently of one another are hydrogen, halogen, $C_1$–$C_{24}$alkyl, $C_1$–$C_6$alkoxy or phenyl, c) dioxazines of the formula

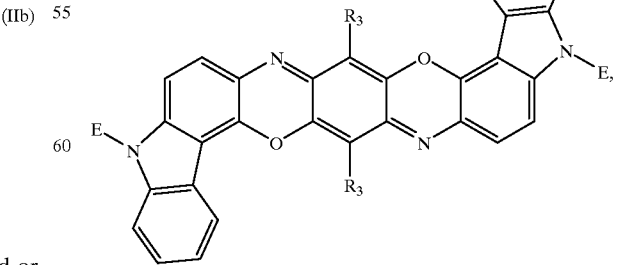

(IV)

in which $R_3$ is hydrogen, halogen or $C_1$–$C_{24}$alkyl, or of the formula

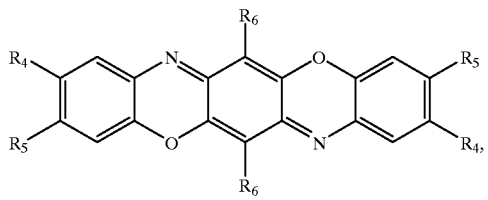

in which $R_4$, $R_5$ and $R_6$ independently of one another are hydrogen, $C_1$–$C_4$alkyl, $C_1$–$C_4$alkoxy, NECOC$_1$–C$_4$alkyl, NECOphenyl or N(E)$_2$ where at least one of the radicals $R_4$, $R_5$ and $R_6$ is NECOC$_1$–C$_4$alkyl, NECOphenyl or N(E)$_2$, d) isoindolines of the formulae

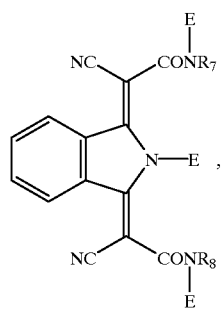
(V)

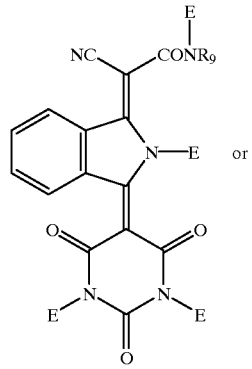
(VI)

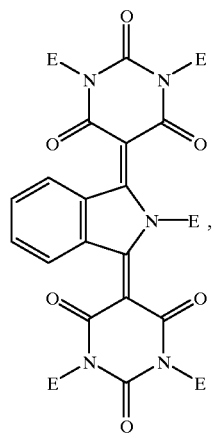
(VII)

in which $R_7$ is a group

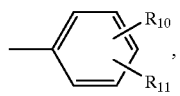

$R_8$ is hydrogen, $C_1$–$C_{24}$alkyl, benzyl or a group

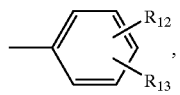

$R_9$ is hydrogen, E or $R_7$, $R_{10}$, $R_{11}$, $R_{12}$ and $R_{13}$ independently of one another are hydrogen, $C_1$–$C_{24}$alkyl, $C_1$–$C_6$alkoxy, halogen or trifluoromethyl, e) isoindolinones of the formula

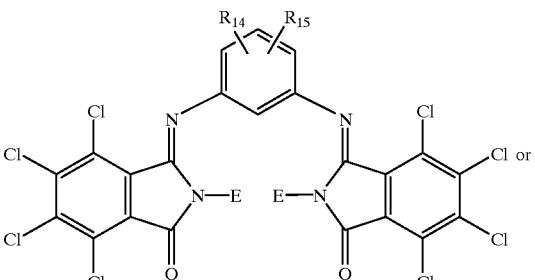
(IXa)

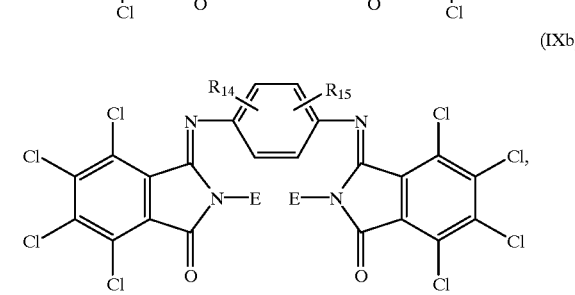
(IXb)

in which $R_{14}$ and $R_{15}$ independently of one another are hydrogen, halogen or $C_1$–$C_4$alkyl, f) anthraquinonoid compounds of the formula

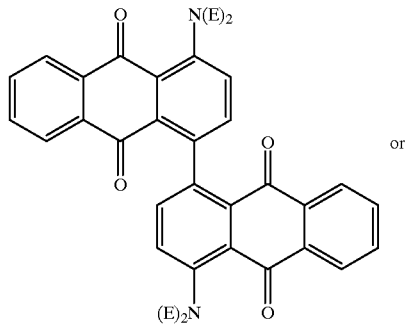
(X)

or

-continued

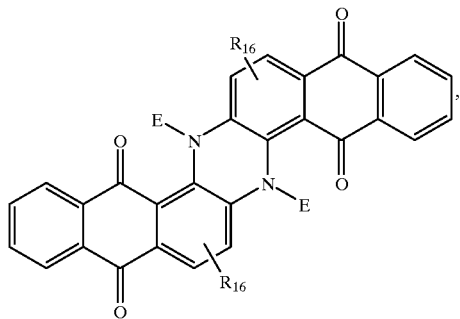
(XI)

in which R$_{16}$ is hydrogen or halogen, g) phthalocyanines of the formula

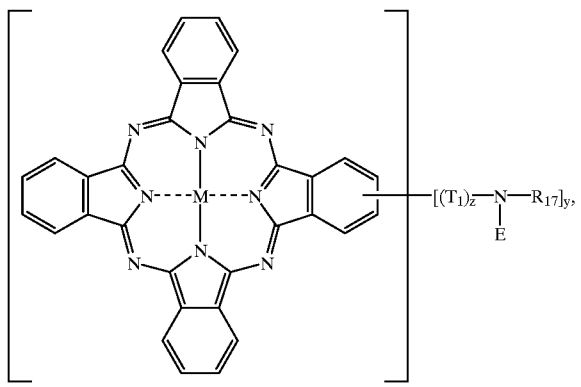
(XII)

in which

M is H$_2$, a divalent metal selected from the group consisting of Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) and Pb(II), preferably Cu(II), Zn(II), Fe(II), Ni(II) or Pd(II), or a divalent oxo metal selected from the group consisting of V(O), Mn(O) and TiO, T$_1$ is a direct bond, —CHR$_{18}$—, —CO— or —SO$_2$—, R$_{17}$ is hydrogen, C$_1$–C$_6$alkyl, C$_1$–C$_6$alkylen-O—E, —N(E)R$_{18}$, N(E)$_2$, —NECOR$_{19}$, —COR$_{19}$ or

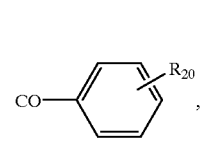

R$_{18}$ is hydrogen or C$_1$–C$_6$alkyl, R$_{19}$ is C$_1$–C$_6$alkyl and

R$_{20}$ is hydrogen, halogen, nitro, C$_1$–C$_6$alkyl or C$_1$–C$_6$alkoxy, z is zero or 1 and y is a number from 1 to 8, h) pyrrolo[3,4-c]pyrroles of the formula

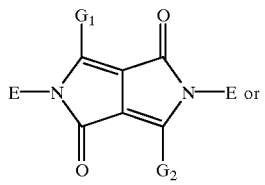
(XIIIa)

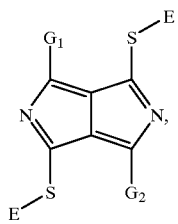
(XIIIb)

in which G$_1$ and G$_2$ independently of one another are a group of the formula

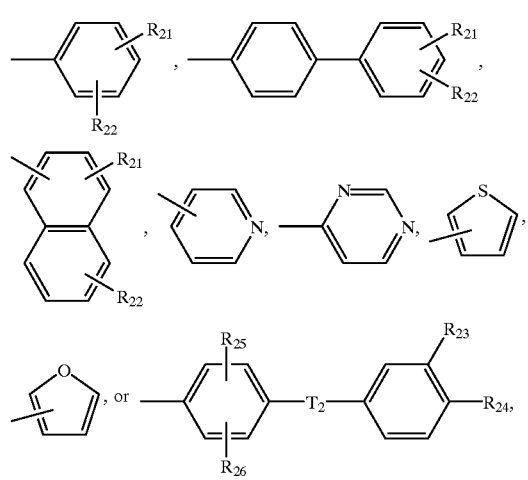

in which

R$_{21}$ and R$_{22}$ independently of one another are hydrogen, halogen, C$_1$–C$_{24}$alkyl, C$_1$–C$_6$alkoxy, C$_1$–C$_{18}$alkylthio, C$_1$–C$_{18}$alkylamino, —CN, —NO$_2$, phenyl, trifluoromethyl, C$_5$–C$_6$cycloalkyl, —C=N—(C$_1$–C$_{24}$alkyl),

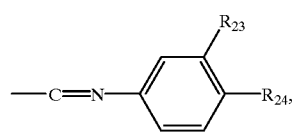

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, T$_2$ is —CH$_2$—, —CH(CH$_3$)—, —C(CH$_3$)$_2$—, —CH=N—, —N=N—, —O—, —S—, —SO—, —SO$_2$— or —NR$_{27}$—, $R_{23}$ and $R_{24}$ independently of one another are hydrogen, halogen, $C_1$–$C_6$alkyl, $C_1$–$C_6$alkoxy or —CN, $R_{25}$ and $R_{26}$ independently of one another are hydrogen, halogen or $C_1$–$C_6$alkyl and $R_{27}$ is hydrogen or $C_1$–$C_6$-alkyl, i) quinophthalones of the formula

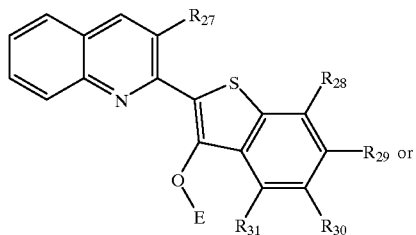
(XIVa)

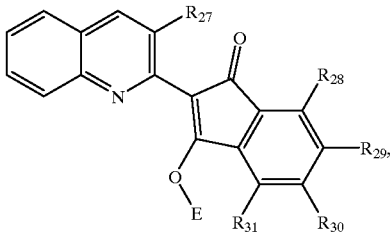
(XIVb)

in which $R_{27}$ is H or O—E, $R_{28}$ to $R_{31}$ independently of one another are hydrogen, halogen, —COO—$C_1$–$C_6$alkyl or —CONE–$C_1$–$C_6$alkyl, j) azo compounds of the formula

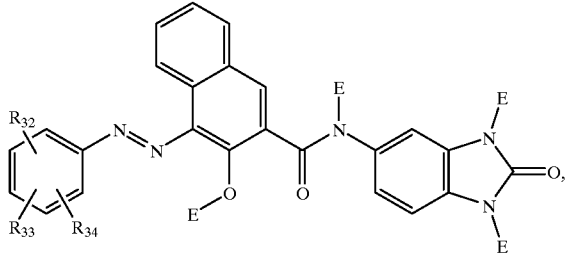
(XVa)

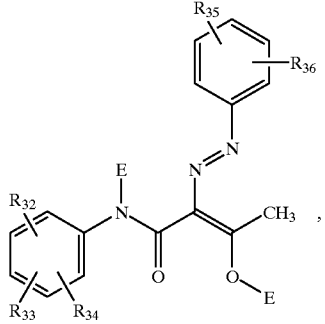
(XVb)

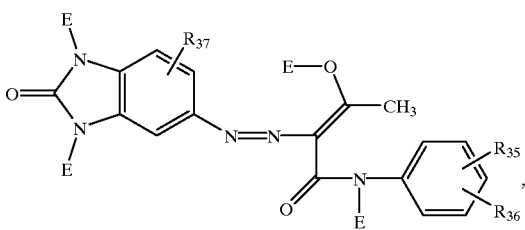
(XVc)

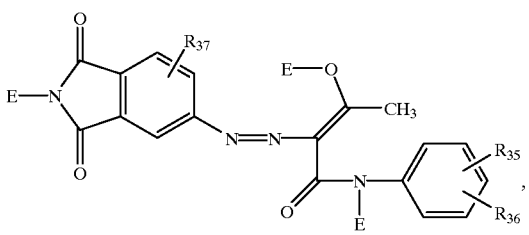
(XVd)

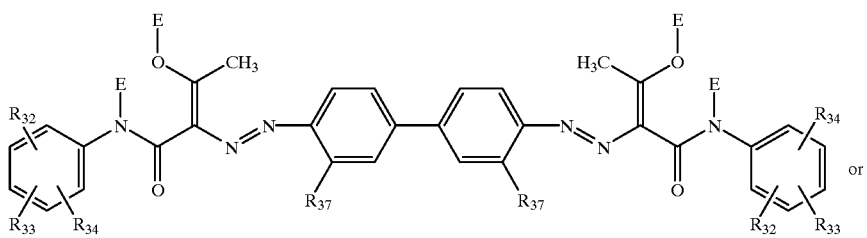
(XVe)

or (XVf)

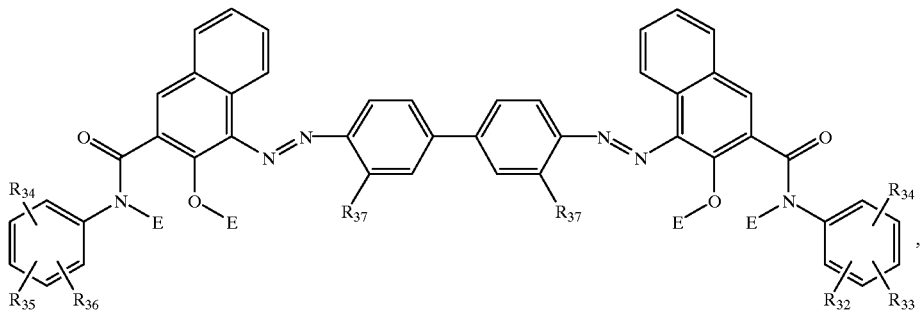

in which

R$_{32}$ to R$_{36}$ independently of one another are hydrogen, halogen, C$_1$–C$_6$alkyl, C$_1$–C$_6$alkoxy, nitro, acetyl or SO$_2$NEC$_1$–C$_6$alkyl, and R$_{37}$ is hydrogen, halogen, C$_1$–C$_6$alkyl or C$_1$–C$_6$alkoxy, k) anthraquinones of the formula (XVIa)

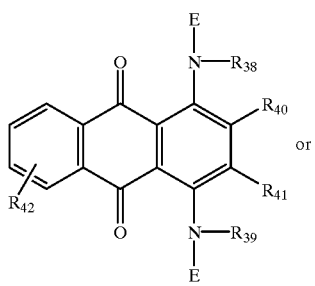

or (XVIb)

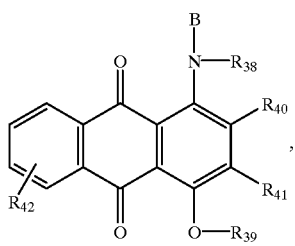

in which

R$_{38}$ and R$_{39}$ independently of one another are hydrogen, C$_1$–C$_{12}$alkyl, or C$_6$–C$_{12}$aryl which is unsubstituted or substituted by halogen, C$_1$–C$_6$alkyl, C$_1$–C$_6$alkoxy, nitro, acetyl, SO$_2$NEC$_1$–C$_6$alkyl or SO$_2$NE$_2$, R$_{40}$ and R$_{41}$ independently of one another are hydrogen, halogen, C$_1$–C$_6$alkyl, C$_1$–C$_6$alkoxy, nitro, cyano, CONE$_2$, SO$_2$NEC$_1$–C$_6$alkyl, SO$_2$NE$_2$, SO$_3$E, SO$_3$Na or C$_6$–C$_{12}$aryl which is unsubstituted or substituted by halogen, C$_1$–C$_6$alkyl, C$_1$–C$_6$alkoxy, nitro, acetyl, SO$_2$NEC$_1$–C$_6$alkyl or SO$_2$NE$_2$, and R42 is hydrogen, halogen, nitro, cyano, hydroxyl or C$_1$–C$_6$alkoxy, and l) indigo or leucoindigo derivatives of the formula (VIIIa)

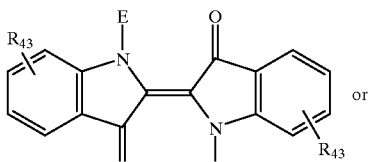

or (VIIIb)

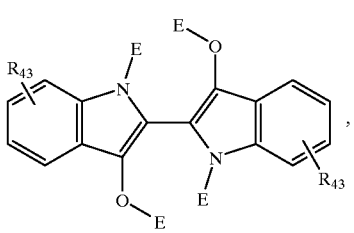

in which R$_{43}$ is hydrogen, CN, C$_1$–C$_6$alkyl, C$_1$–C$_6$alkoxy or halogen, where in each case in the above-mentioned formulae each E independently of the others is hydrogen or B, with the proviso that in each formula E is B on at least one occasion, and B is as defined above.

Preferred quinacridones are those, wherein in formula III R$_1$ and R$_2$ independently of one another are hydrogen, chlorine or methyl.

Preferred pyrrolo[3,4-c]pyrroles are those, wherein in formula XIII G$_1$ and G$_2$ are identical and are a group of the formula

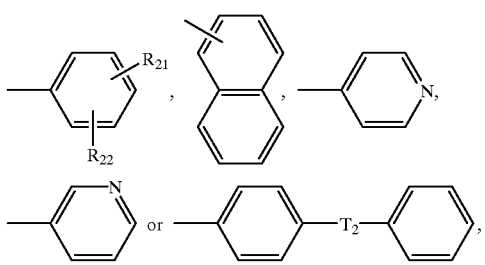

where R$_{21}$, and R$_{22}$ independently of one another are hydrogen, chlorine, bromine, C$_1$–C$_4$alkyl, C$_1$–C$_6$alkoxy, C$_1$–C$_6$alkylamino, CN or phenyl, $T_2$ is —O—, —$NR_{27}$—, —N=N— or —$SO_2$—, and $R_{27}$ is hydrogen, methyl or ethyl.

Preferred azo compounds are those, wherein in the formulae XVa to XVf $R_{32}$ to $R_{36}$ independently of one another are hydrogen, halogen, methyl, methoxy, nitro, acetyl or $SO_2NECH_3$, and $R_{37}$ is halogen or methoxy.

Particularly preferred are quinacridones of the formula (XVII)

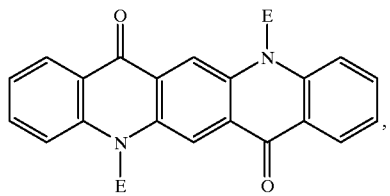

(XVIIIa)

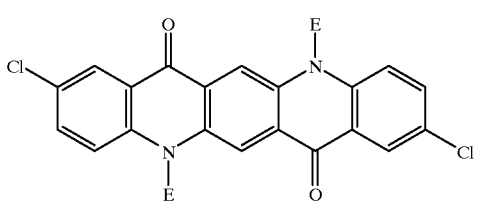

or (XVIIIb)

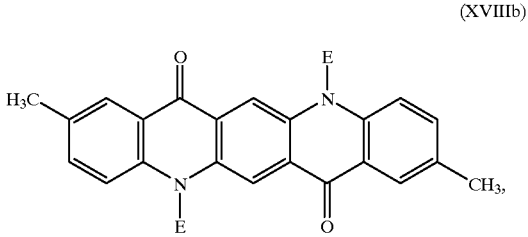

in which E is hydrogen or B, with the proviso that in each formula E is B on at least one occasion, and B is as defined above, dioxazines of the formula (IVb)

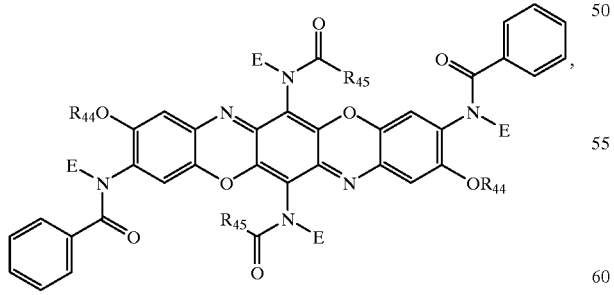

in which $R_{44}$ and $R_{45}$ independently of one another are $C_1$–$C_4$alkyl, and E is hydrogen or B, with the proviso that E is B on at least one occasion, and B is as defined above, pyrrolopyrroles of the formula (XIX)

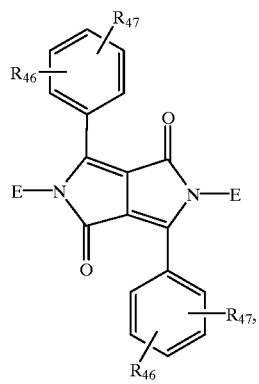

in which $R_{46}$ and $R_{47}$ independently of one another are hydrogen, methyl, tert-butyl, chlorine, bromine, CN or phenyl, and E is hydrogen or B, with the proviso that E is B on at least one occasion, and B is as defined above, phthalocyanines of the formula (XII) in which M is Cu(II) and $R_{16}$ is hydrogen or E, and z is 1 and y is a number from 1 to 4, with the proviso that E is B on at least one occasion, and B is as defined above, isoindolinones of the formula (XX)

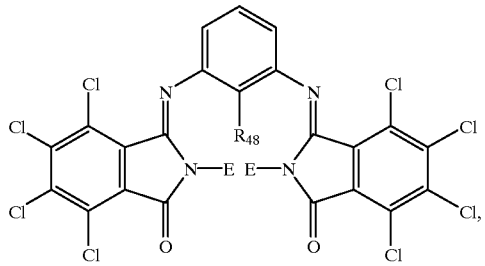

in which $R_{48}$ is hydrogen or $C_1$—$C_4$alkyl, and E is hydrogen or B, with the proviso that E is B on at least one occasion, and B is as defined above, indanthrones of the formula (XXI)

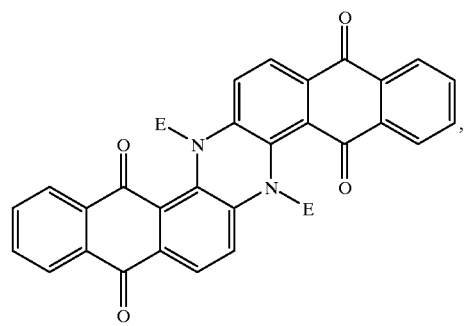

in which E is hydrogen or B, with the proviso that E is B on at least one occasion, and B is as defined above, Phthalocyanines of the formula XII, in which $T_1$ is a direct bond, and azo compounds of the formula XVa, XVb, XVe or XVf, in which $R_{32}$ to $R_{36}$ independently of one another are hydrogen, chlorine, methoxy, nitro, acetyl or $SO_2NECH_3$, and $R_{37}$ is halogen or methoxy, with the proviso that in each formula E is B on at least one occasion, and B is as defined above.

Particularly noteworthy soluble chromophores are those which can be prepared from Colour Index Pigment Yellow 13, Pigment Yellow 73, Pigment Yellow 74, Pigment Yellow 83, Pigment Yellow 93, Pigment Yellow 94, Pigment Yellow 95, Pigment Yellow 109, Pigment Yellow 110, Pigment Yellow 120, Pigment Yellow 128, Pigment Yellow 139, Pigment Yellow 151, Pigment Yellow 154, Pigment Yellow 175, Pigment Yellow 180, Pigment Yellow 181, Pigment Yellow 185, Pigment Yellow 194, Pigment Orange 31, Pigment Orange 71, Pigment Orange 73, Pigment Red 122, Pigment Red 144, Pigment Red 166, Pigment Red 184, Pigment Red 185, Pigment Red 202, Pigment Red 214, Pigment Red 220, Pigment Red 221, Pigment Red 222, Pigment Red 242, Pigment Red 248, Pigment Red 254, Pigment Red 255, Pigment Red 262, Pigment Red 264, Pigment Brown 23, Pigment Brown 41, Pigment Brown 42, Pigment Blue 25, Pigment Blue 26, Pigment Blue 60, Pigment Blue 64, Pigment Violet 19, Pigment Violet 29, Pigment Violet 32, Pigment Violet 37, 3,6-Di(4'-cyano-phenyl)-2,5-dihydro-pyrrolo[3,4-c]pyrrole-1,4-dion, 3,6-Di(3,4-dichloro-phenyl)-2,5-dihydro-pyrrolo[3,4-c]-pyrrole-1,4-dion or 3-Phenyl-6-(4'-tert-butyl-phenyl)-2,5-dihydro-pyrrolo[3,4-c]pyrrole-1,4-dion.

The compounds of the formulae I to XXI are known or can be prepared in analogy to methods known per se, as described, for example, in EP 648 770, EP 648 817 and EP 742 556.

Preferably, —L is a group of the formula

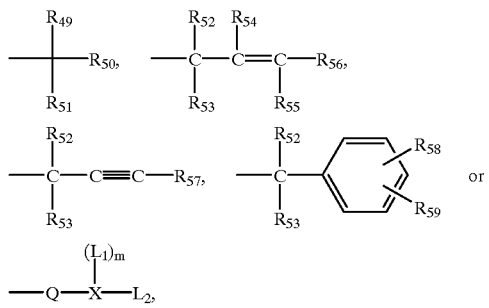

in which $R_{49}$, $R_{50}$ and $R_{51}$ independently of one another are $C_1-C_6$alkyl, $R_{52}$ and $R_{53}$ independently of one another are $C_1-C_6$alkyl, O, S or $N(R_{60})_2$-interrupted $C_1-C_6$alkyl, unsubstituted or $C_1-C_6$alkyl-, $C_1-C_6$alkoxy-, halo-, cyano- or nitro-substituted phenyl or biphenylyl, $R_{54}$, $R_{55}$ and $R_{56}$ independently of one another are hydrogen or $C_1-C_6$alkyl, $R_{57}$ is hydrogen, $C_1-C_6$alkyl or a group of the formula

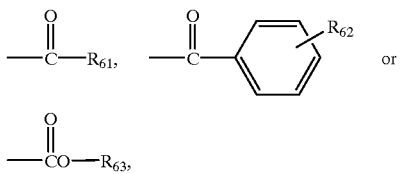

$R_{58}$ and $R_{59}$ independently of one another are hydrogen, $C_1-C_6$alkyl, $C_1-C_6$alkoxy, halogen, cyano, nitro, $N(R_{60})_2$, unsubstituted or halo-, cyano-, nitro-, $C_1-C_6$alkyl- or $C_1-C_6$alkoxy-substituted phenyl, $R_{60}$ and $R_{61}$ are $C_1-C_6$alkyl, $R_{62}$ is hydrogen or $C_1-C_6$alkyl and $R_{63}$ is hydrogen, $C_1-C_6$alkyl, unsubstituted or $C_1-C_6$alkyl-substituted phenyl, Q is p,q-$C_2-C_6$alkylene which is unsubstituted or substituted one or more times by $C_1-C_6$alkoxy, $C_1-C_6$alkylthio or $C_2-C_{12}$dialkylamino, p and q being different numeric locants, X is a heteroatom selected from the group consisting of N, O and S, where m is 0 if X is O or S and is 1 if X is N, and $L_1$ and $L_2$ independently of one another are unsubstituted or mono- or poly-$C_1-C_{12}$alkoxy-, —$C_1-C_{12}$alkylthio-, —$C_2-C_{24}$dialkylamino-, —$C_6-C_{12}$aryloxy-, —$C_6-C_{12}$arylthio-, —$C_7-C_{24}$alkylarylamino- or —$C_{12}-C_{24}$diarylamino-substituted $C_1-C_6$alkyl or [-(p', q'-$C_2-C_6$alkylene)-Z—]$_n$—$C_1-C_6$alkyl, where n is a number from 1 to 1000, p' and q' are different numeric locants, each Z independently of the others is a heteroatom O, S or $C_1-C_{12}$alkyl-substituted N, and $C_2-C_6$alkylene in the repeating units [—$C_2-C_6$alkylene-Z—] can be identical or different, and $L_1$ and $L_2$ can be saturated or mono- to deca-unsaturated, uninterrupted or interrupted in any desired points by from 1 to 10 groups selected from the group consisting of —(C=O)— and —$C_6H_4$—, and may carry no or 1 to 10 further substituents selected from the group consisting of halogen, cyano and nitro.

Of particular interest are compounds of the formula (I) in which L is $C_1-C_6$alkyl or

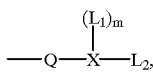

in which Q is $C_2-C_4$alkylene and $L_1$ and $L_2$ are [—$C_2-C_{12}$alkylene-Z—]$_n$—$C_1-C_{12}$alkyl or are $C_1-C_{12}$alkyl which is substituted one or more times by $C_1-C_{12}$alkoxy, $C_1-C_{12}$alkylthio or $C_2-C_{24}$dialkylamino, and m and n are as defined above.

Of very particular interest are compounds of the formula (I) in which L is $C_4-C_5$alkyl (especially tert-butyl or tert-amyl) or

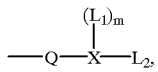

in which Q is $C_2$–$C_4$alkylene, X is O and m is zero, and $L_2$ is [—$C_2$–$C_{12}$alkylene-O—]$_n$—$C_1$–$C_{12}$alkyl or is $C_1$–$C_{12}$alkyl which is substituted one or more times by $C_1$–$C_{12}$alkoxy, especially those in which —Q—X— is a group of the formula —C(CH$_3$)$_2$—CH$_2$—O—.

Alkyl or alkylene can be straight-chain, branched, monocyclic or polycyclic.

Thus $C_1$–$C_{12}$alkyl is, for example, methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, bornyl, 1-adamantyl, 2-adamantyl or dodecyl.

If $C_2$–$C_{12}$alkyl is mono- or polyunsaturated it is $C_2$–$C_{12}$alkenyl, $C_2$–$C_{12}$alkynyl, $C_2$–$C_{12}$alkapolyenyl or $C_2$–$C_{12}$alkapolyynyl in which two or more double bonds may if appropriate be isolated or conjugated, examples being vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or the various isomers of hexenyl, octenyl, nonenyl, decenyl or dodecenyl.

$C_2$–$C_4$alkylene is, for example, 1,2-ethylene, 1,2-propylene, 1,3-propylene, 1,2-butylene, 1,3-butylene, 2,3-butylene, 1,4-butylene or 2-methyl-1,2-propylene. $C_5$–$C_{12}$alkylene is, for example, an isomer of pentylene, hexylene, octylene, decylene or dodecylene.

$C_1$–$C_{12}$alkoxy is O—$C_1$–$C_{12}$alkyl, preferably O—$C_1$–$C_4$alkyl.

$C_6$–$C_{12}$aryloxy is O—$C_6$–$C_{12}$aryl, for example phenoxy or naphthoxy, preferably phenoxy.

$C_1$–$C_{12}$alkylthio is S—$C_1$–$C_{12}$alkyl, preferably S—$C_1$–$C_4$alkyl.

$C_6$–$C_{12}$arylthio is S—$C_6$–$C_{12}$aryl, for example phenylthio or naphthylthio, preferably phenylthio.

$C_2$–$C_{24}$dialkylamino is N(alkyl$_1$)(alkyl$_2$), where the sum of the carbon atoms in the two groups alkyl$_1$ and alkyl$_2$ is from 2 to 24, preferably N($C_1$–$C_4$alkyl)-$C_1$–$C_4$alkyl.

$C_7$–$C_{24}$alkylarylamino is N(alkyl$_1$)(aryl$_2$), where the sum of the carbon atoms in the two groups alkyl$_1$ and aryl$_2$ is from 7 to 24, for example methylphenylamino, ethylnaphthylamino or butylphenanthrylamino, preferably methylphenylamino or ethylphenylamino.

$C_{12}$–$C_{24}$diarylamino is N(aryl$_1$)(aryl$_2$), where the sum of the carbon atoms in the two groups aryl$_1$ and aryl$_2$ is from 12 to 24, for example diphenylamino or phenylnaphthylamino, preferably diphenylamino.

Halogen is chlorine, bromine, fluorine or iodine, preferably fluorine or chlorine.

n is preferably a number from 1 to 100, with particular preference a number from 2 to 12.

The heating or irradiation step (b) of the process of this invention can be carried out by any desired means; for example, by treatment in a thermal oven or by electromagnetic radiation, for example visible light, UV or IR radiation, or microwaves or induction, in the presence or absence of a catalyst. The conditions required for fragmentation are known per se for each class of pigment precursors. Step (b) is usually accomplished by heating to a temperature of from 100 to 350° C., preferably from 150 to 250° C., particularly preferably from 160 to 200° C., or by providing by other means an amount of energy sufficient for said pigment precursor to be heated to said temperature. The fragmentation temperature may be lowered in known manner by using a catalyst, for example an acid.

The heating time is not critical, as long as care is taken that it is sufficiently long for the fragmentation to be completed. Typically, it ranges from several seconds to several hours, preferably from about 1 to about 30 minutes. The required heating time can be decreased by elevating the temperature or increasing the amount of energy which is provided.

The invention relates also to a metal oxide or a material comprising a solid substrate and a layer of a metal oxide, wherein the metal oxide or metal oxide layer comprises a pigment precursor which is soluble at a concentration of at least 0.01% by weight in an organic solvent and can be fragmented to an organic pigment by means of heating or irradiation.

The invention furthermore also relates to a coloured metal oxide, wherein the metal oxide comprises an effective pigmenting amount of an organic pigment, with the proviso that the coloured metal oxide is not pumice, fired clay, unglazed porcelain, gypsum, concrete, kieselguhr, silica gel or a zeolite.

The invention furthermore also relates to a material comprising a metallic substrate and a layer of a coloured metal oxide, wherein the metal oxide layer comprises an effective pigmenting amount of an organic pigment. Preferably, the metal of the oxide's layer is the same as the metal of the substrate. The metal oxide layer is more preferably sealed, particularly sealed by a metal hydroxide, most preferably sealed by a hydroxide of the oxide's metal. In a particular embodiment, the material is a flake.

The invention further also relates to a material comprising a solid substrate and an at least 0.05 μm thick layer of a coloured metal oxide, wherein the metal oxide layer comprises an effective pigmenting amount of an organic pigment.

The examples which follow illustrate the invention:

EXAMPLE 1A

A 80×30×3 mm plate of anodized aluminium having a 6 μm thick surface layer of aluminium oxide is dipped for 30 s into a solution of 1.0 g compound of the formula

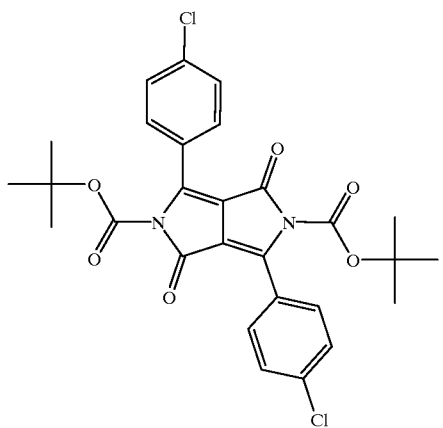

in 20 ml of tetrahydrofuran. The plate is then dripped off and dried.

EXAMPLE 1B

The plate according to example 1A is heated to 200° C. for 10 minutes in an oven. The colour turns from yellow to bright red.

EXAMPLE 1C

The plate according to example 1B is dipped for 10 minutes into boiling water. The rub-fastness and light stability are excellent.

EXAMPLE 2A

A 80×30×3 mm plate of anodized aluminium having a 6 µm thick surface layer of aluminium oxide is dipped for 30 s into a solution of 0.2 g compound of the formula

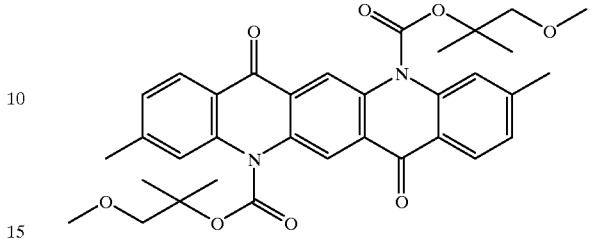

in 20 ml of tetrahydrofuran. The plate is then dripped off and dried.

EXAMPLE 2B

The plate according to example 2A is heated to 220° C. for 10 minutes in an oven. The colour turns to pink.

EXAMPLE 2C

The plate according to example 2B is dipped for 10 minutes into boiling water. The rub-fastness and light stability are excellent.

EXAMPLE 3A

A 80×30×3 mm plate of anodized aluminium having a 6 µm thick surface layer of aluminium oxide is dipped for 4 minutes into a solution of 5.0 g compound of the formula

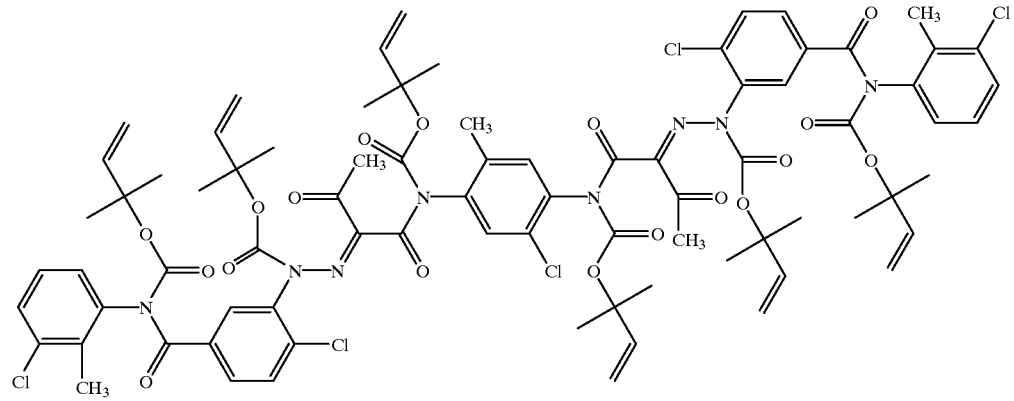

in 20 ml of ethyl acetate. The plate is then dripped off and dried.

EXAMPLE 3B

The plate according to example 3A is heated to 150° C. for 10 minutes in an oven. The colour turns to bright yellow.

EXAMPLE 3C

The plate according to example 3B is dipped for 10 minutes into boiling water. The rub-fastness and light stability are excellent.

EXAMPLE 4A

A 80×30×3 mm plate of anodized aluminium having a 6 μm thick surface layer of aluminium oxide is dipped for 4 minutes into a solution of 10.0 g compound of the formula

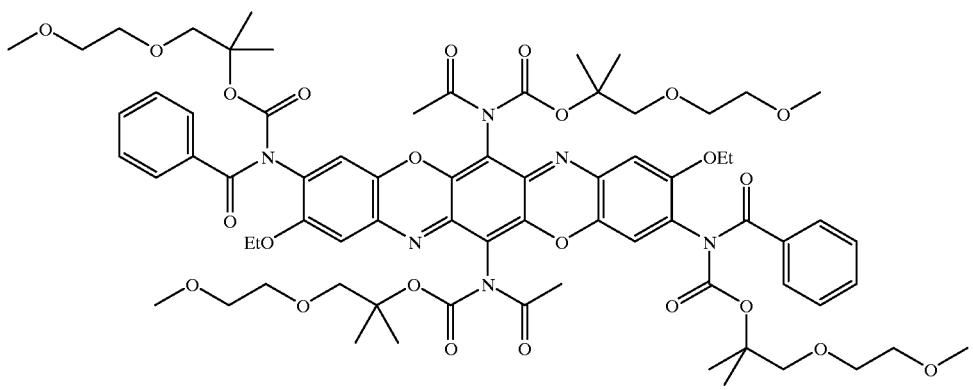

in 20 ml of dichloromethane. The plate is then dripped off and dried.

EXAMPLE 4B

The plate according to example 4A is heated to 250° C. for 10 minutes in an oven. The colour turns to deep violet.

EXAMPLE 4C

The plate according to example 4B is dipped for 10 minutes into boiling water. The rub-fastness and light stability are excellent.

EXAMPLE 5A

A 80×30×3 mm plate of anodized aluminium having a 6 μm thick surface layer of aluminium oxide is dipped for 4 minutes into a solution of 5.0 g compound of the formula

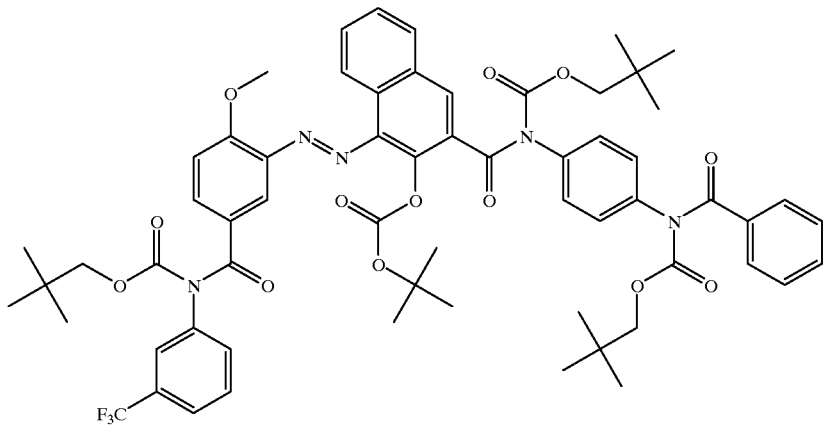

in 20 ml of tetrahydrofuran. The plate is then dripped off and dried.

EXAMPLE 5B

The plate according to example 5A is heated to 170° C. for 10 minutes in an oven. The colour turns to deep bluish red.

EXAMPLE 5C

The plate according to example 5B is dipped for 10 minutes into boiling water. The rub-fastness and light stability are excellent.

EXAMPLE 6A

A 80×30×3 mm plate of anodized aluminium having a 6 µm thick surface layer of aluminium oxide is dipped for 4 minutes into a solution of 4.0 g compound of the formula

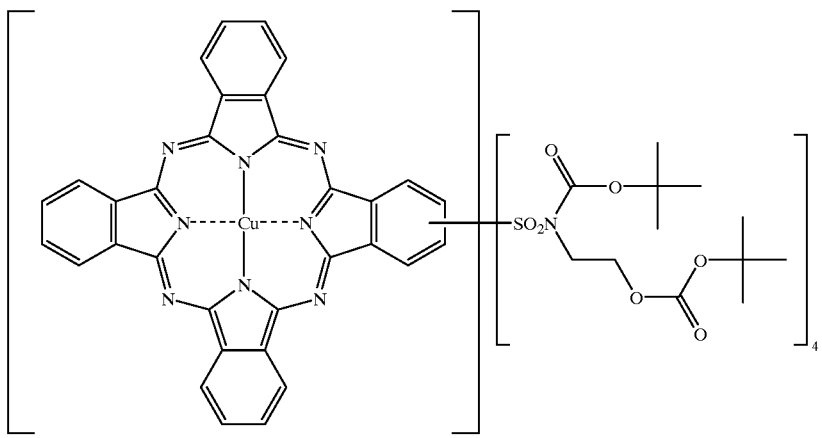

in 20 ml of acetonitrile. The plate is then dripped off and dried.

EXAMPLE 6B

The plate according to example 6A is heated to 200° C. for 10 minutes in an oven. The colour turns to deep blue.

EXAMPLE 6C

The plate according to example 6B is dipped for 10 minutes into boiling water. The rub-fastness and light stability are excellent.

EXAMPLE 6D

It is proceded analogously to examples 6A to 6C, with the difference that aluminium flakes of particle size 50×50×5 µm with a 0.5 µm oxide layer are used.

EXAMPLE 6E

The bluish flakes of example 6D are coated 220 nm thick with rutile by physical vapor deposition. An effect pigment with excellent optical and fastness properties is obtained.

EXAMPLES 6F/6G

The flakes of examples 6D/6E are used in a metallic paint composition.

EXAMPLE 7A

A 80×30×3 mm plate of anodized aluminium having a 6 µm thick surface layer of aluminium oxide is dipped for 4 minutes into a solution of 1.5 g compound of the formula

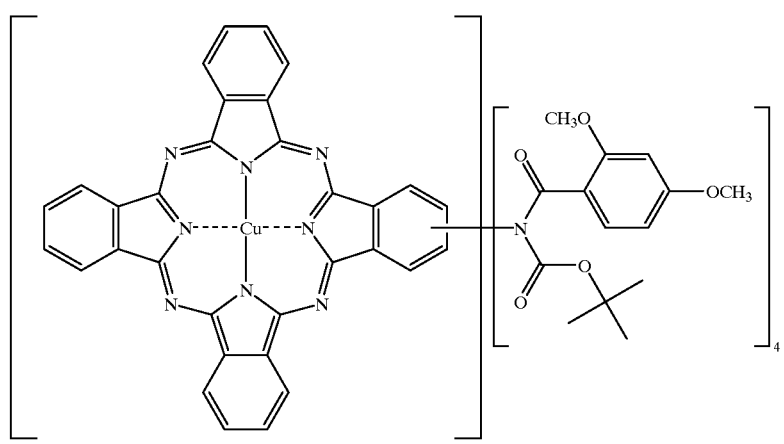

in 20 ml of tetrahydrofuran. The plate is then dripped off and dried.

EXAMPLE 7B

The plate according to example 7A is heated to 200° C. for 10 minutes in an oven. The colour turns to bright green.

EXAMPLE 7C

The plate according to example 7B is dipped for 10 minutes into boiling water. The rub-fastness and light stability are excellent.

EXAMPLE 8A 200 g of neutral aluminium oxide (for chromatography, n° 6300, 105–120 μm, Fluka AG, Buchs/Switzerland) are given under stirring into a solution of 490 g of the compound of example 4A in 655 g of dichloromethane. The mixture is then filtered. The residue is washed with petroleum ether, dried at 20° C./200 mbar, then heated to 200° C. for 20 minutes. A violet powder is obtained.

EXAMPLE 8B

Example 8A is repeated, with the difference that the product is exposed to 120° C. hot steam for 20 minutes just at the end the heat treatment. The product is then pulverised.

EXAMPLE 8C 90 g of the product of example 8A are dry-milled in a porcelain ball mill, then incorporated into 210 g of a water-based automotive paint composition by means of a 125 ml pearl mill (Dispermat SL™; Hediger) filled with 207 g of zirkonium mixed oxide pearls of diameter 1,0 to 1,2 mm (Hermann Oeckel Ingenieur GmbH, D-95100 Selb).

EXAMPLE 8D

Onto a blank steel panel, they are sprayed in this order a standard precoating composition, the paint composition of example 8C, and a standard transparent topcoating composition. After curing, there is obtained a very light and weather-fast violet coating.

EXAMPLE 8E

Examples 8C and 8D are repeated with the product of example 8B.

What is claimed is:

1. A process for preparing a coloured metal oxide or a material comprising a solid substrate and a layer of a coloured metal oxide, wherein the coloured metal oxide or metal oxide layer comprises an effective colouring amount of an organic pigment, which process comprises
    (a) treating a porous metal oxide or a material comprising a surface layer of a porous metal oxide with a solution or melt of a soluble pigment precursor such that at least part of the pigment precursor enters the pores of the metal oxide, and
    (b) regenerating said organic pigment within the pores, through fragmentation of the pigment precursor that has entered the pores of the metal oxide in accordance with treatment (a), by means of heating or irradiation, with the proviso that the coloured metal oxide is not pumice, fired clay, unglazed porcelain, gypsum, concrete, kieselguhr, silica gel or a zeolite.

2. A process according to claim 1, wherein said metal oxide is the oxide of an element of the periodic table's groups 2, 3, 4, 12, 13 or 14 (IUPAC) or a mixture thereof.

3. A process according to claim 1, wherein said metal oxide additionally contains anions of mineral acids.

4. A process according to claim 1, wherein the pigment precursor is a compound of the formula (I)

$$A(B)_x \qquad (I),$$

in which x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series which is attached to x groups B via one or more heteroatoms selected from the group consisting of N, O and S and forming part of the radical A, B is hydrogen or a group of the formula

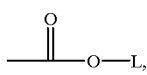

where at least one group B is not hydrogen and, if x is from 2 to 8, the groups B can be identical or different, and L is any suitable solubilizing group.

5. A process according to claim 4, in which —L is a group of the formula

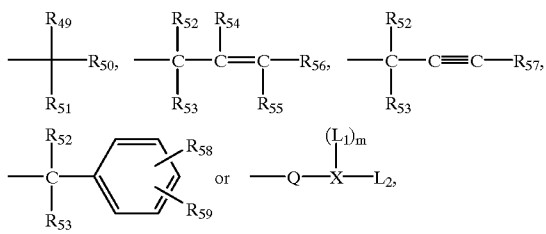

in which $R_{49}$, $R_{50}$ and $R_{51}$ independently of one another are $C_1$–$C_6$alkyl, $R_{52}$ and $R_{53}$ independently of one another are $C_1$–$C_6$alkyl, O, S or $N(R_{60})_2$-interrupted $C_1$–$C_6$alkyl, unsubstituted or $C_1$–$C_6$alkyl-, $C_1$–$C_6$alkoxy-, halo-, cyano- or nitro-substituted phenyl or biphenylyl, $R_{54}$, $R_{55}$ and $R_{56}$ independently of one another are hydrogen or $C_1$–$C_6$alkyl, $R_{57}$ is hydrogen, $C_1$–$C_6$alkyl or a group of the formula

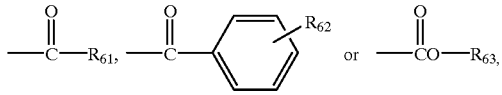

$R_{58}$ and $R_{59}$ independently of one another are hydrogen, $C_1$–$C_6$alkyl, $C_1$–$C_6$alkoxy, halogen, cyano, nitro, $N(R_{60})_2$, unsubstituted or halo-, cyano-, nitro-, $C_1$–$C_6$alkyl- or $C_1$–$C_6$alkoxy-substituted phenyl, $R_{60}$ and $R_{61}$ are $C_1$–$C_6$alkyl, $R_{62}$ is hydrogen or $C_1$–$C_6$alkyl and $R_{63}$ is hydrogen, $C_1$–$C_6$alkyl, unsubstituted or $C_1$–$C_6$alkyl-substituted phenyl, Q is p,q-$C_2$–$C_6$alkylene which is unsubstituted or substituted one or more times by $C_1$–$C_6$alkoxy, $C_1$–$C_6$alkylthio or $C_2$–$C_{12}$dialkylamino, p and q being different numeric locants, X is a heteroatom selected from the group consisting of N, O and S, where m is 0 if X is O or S and is 1 if X is N, and $L_1$ and $L_2$ independently of one another are unsubstituted or mono- or poly-$C_1$-$C_{12}$alkoxy-, —$C_1$-$C_{12}$alkylthio-, —$C_2$-$C_{24}$dialkylamino-, —$C_6$-$C_{12}$aryloxy-, —$C_6$-$C_{12}$arylthio-, —$C_7$-$C_{24}$alkylarylamino- or —$C_{12}$-$C_{24}$diarylamino- substituted $C_1$-$C_6$alkyl or [-(p',q'-$C_2$-$C_6$alkylene)-Z—]$_n$—$C_1$-$C_6$alkyl, where n is a number from 1 to 1000, p' and q' are different numeric locants, each Z independently of the others is a heteroatom O, S or $C_1$-$C_{12}$alkyl-substituted N, and $C_2$-$C_6$alkylene in the repeating units [—$C_2$-$C_6$alkylene-Z—] can be identical or different, and $L_1$ and $L_2$ can be saturated or mono- to deca-unsaturated, uninterrupted or interrupted in any desired points by from 1 to 10 groups selected from the group consisting of —(C═O)— and —$C_6H_4$—, and may carry no or 1 to 10 further substituents selected from the group consisting of halogen, cyano and nitro.

6. A process according to claim 1, wherein step (b) is accomplished by heating to a temperature of from 100 to 350° C. or by providing by other means an amount of energy sufficient for said pigment precursor to be heated to said temperature.

7. A metal oxide or a material comprising a solid substrate and a layer of a metal oxide, wherein the metal oxide or metal oxide layer comprises a pigment precursor which is soluble at a concentration of at least 0.01% by weight in an organic solvent and can be fragmented to an organic pigment by means of heating or irradiation.

8. A material comprising a metallic substrate bearing a porous layer of metal oxide obtained by oxidation of said metallic substrate, wherein said porous layer has a thickness of at least 0.05 μm and is characterized by pores the average cross-section of which is from $1·10^{-18}$ to $1.8·10^{-15}$ m², which pores hold an effective pigmenting amount of an organic pigment.

9. A material according to claim 8, wherein said material is a flake.

10. A composition comprising a high molecular mass organic material and an effective pigmenting amount of a material according to claims 9.

11. A process according to claim 2, wherein said metal oxide is an oxide of Al, Si, Zr, Mg or Ti.

12. A process according to claim 6, wherein step (b) is accomplished by heating to a temperature of from 150 to 250° C. or by providing by other means an amount of energy sufficient for said pigment precursor to be heated to said temperature.

13. A material according to claim 8, wherein said metallic substrate is aluminum or an alloy thereof.

14. A material according to claim 9, wherein said metallic substrate is an aluminum flake.

15. A material according to claim 8, wherein said porous layer has a thickness of at least 0.5 μm.

16. A material according to claim 8, wherein said porous layer has a thickness of from 1 to 250 μm.

17. A material according to claim 16, wherein said porous layer has a thickness of from 3 to 50 μm.

18. A material according to claim 8, wherein said porous layer is characterized by pores the average cross-section of which is from $1·10^{-17}$ to $1.8·10^{-15}$ m².

19. A material according to claim 8, additionally comprising an outer coating of a transparent or selectively absorbing dielectric material of specific electrical resistance at least $10^{10}$ Ω·cm.

20. A material according to claim 19, wherein said dielectric material consists of a metal oxide, oxide hydrate, hydroxide or metal fluoride, or a mixture thereof.

21. A material according to claim 20, wherein said dielectric material consists of $TiO_2$, $ZrO_2$, $SiO_2$, $SnO_2$, $GeO_2$, ZnO, MgO, $Al_2O_3$, $Al_2O_3$.3 $H_2O$ or $MgF_2$, or a mixture thereof.

22. A material according to claim 19, wherein said outer coating is protective and has a thickness no greater than 200 nm.

23. A material according to claim 22, wherein said outer coating has a thickness no greater than 100 nm.

24. A material according to claim 9, additionally comprising an outer coating of a transparent or selectively absorbing dielectric material of specific electrical resistance at least $10^{10}$ Ω·cm.

25. A material according to claim 24, wherein said outer coating has a thickness of from 100 to 400 nm and consists of a dielectric material having a refractive index above 2.0.

26. A material according to claim 25, wherein said dielectric material consists of $TiO_2$, $ZrO_2$, $SiO_2$, $SnO_2$, $GeO_2$, ZnO, MgO, $Al_2O_3$, $Al_2O_3$.3 $H_2O$ or $MgF_2$, or a mixture thereof.

27. A material according to claims 13, wherein said porous layer holding an effective pigmenting amount of an organic pigment has been partially or entirely transformed into aluminum hydroxide by a treatment with hot vapor.

28. A composition comprising a high molecular mass organic material and an effective pigmenting amount of a material according to claim 14.

29. A composition comprising a high molecular mass organic material and an effective pigmenting amount of a material according to claim 24.

30. A composition comprising a high molecular mass organic material and an effective pigmenting amount of a material according to claim 25.

31. A composition comprising a high molecular mass organic material and an effective pigmenting amount of a material according to claim 26.

* * * * *

UNITED STATES PATENT AND TRADEMARK OFFICE
CERTIFICATE OF CORRECTION

| | |
|---|---|
| PATENT NO. | : 6,258,158 B1 |
| DATED | : July 10, 2001 |
| INVENTOR(S) | : Philippe Bugnon et al. |

It is certified that error appears in the above-identified patent and that said Letters Patent is hereby corrected as shown below:

Title page,
Item [75], the second inventor's residence should read: -- Kobe City (JP) --.
Item [30], Foreign Application Priority Data", the foreign country should read: -- Europe --.

Signed and Sealed this

Seventh Day of May, 2002

Attest:

JAMES E. ROGAN
*Attesting Officer*  *Director of the United States Patent and Trademark Office*